June 20, 1944.  R. DABBS  2,351,601
SKID CHAIN APPLIER
Filed June 11, 1941  2 Sheets-Sheet 1
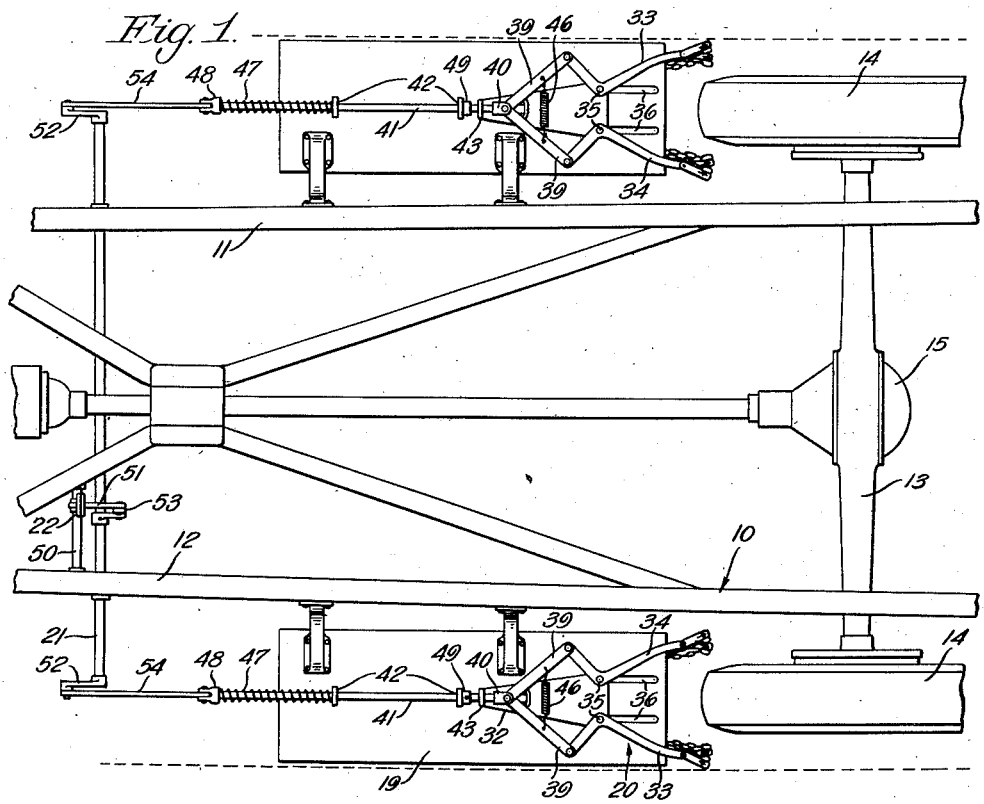
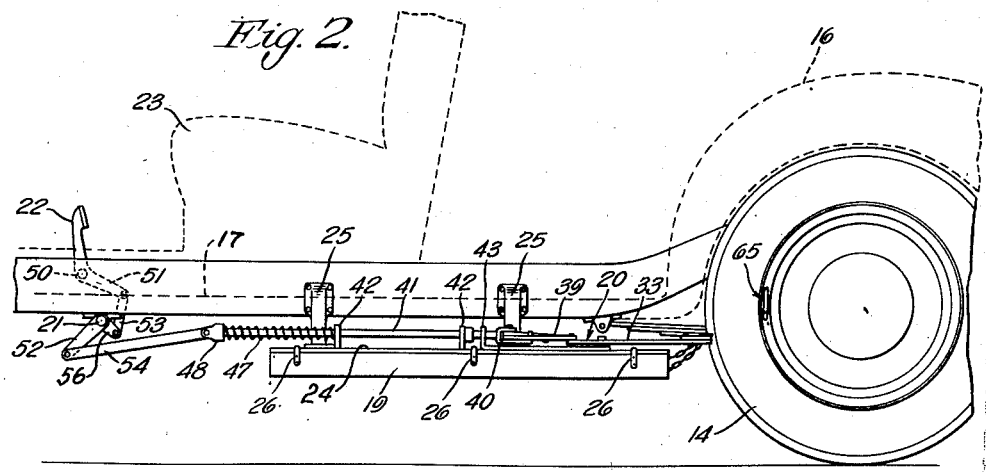
Robert Dabbs.
INVENTOR
BY *Victor J. Evans & Co.*
ATTORNEYS

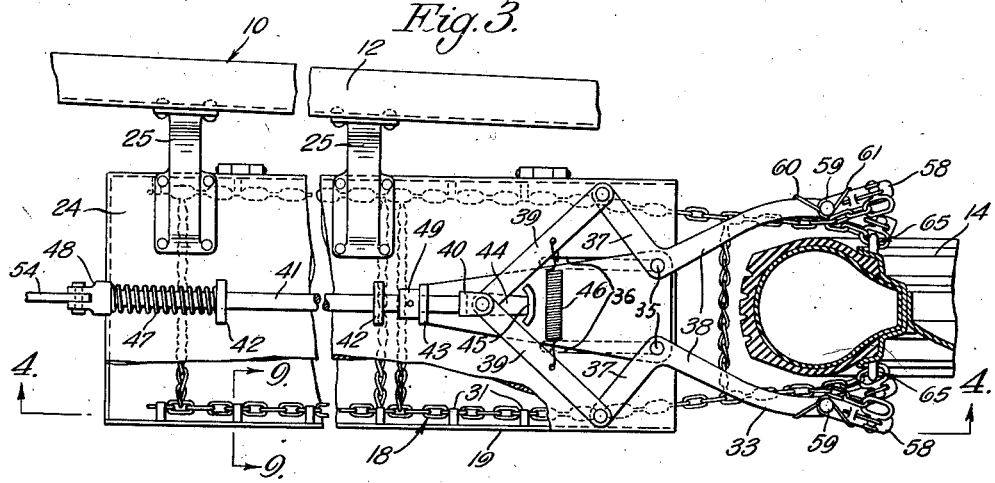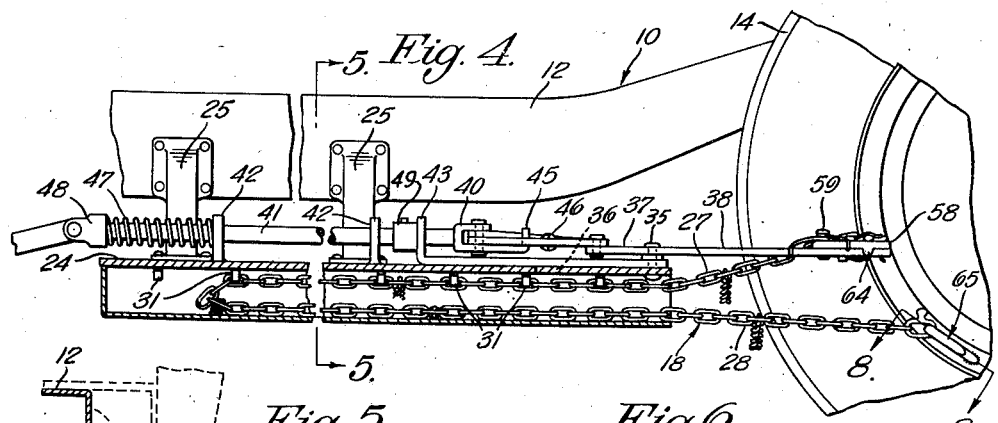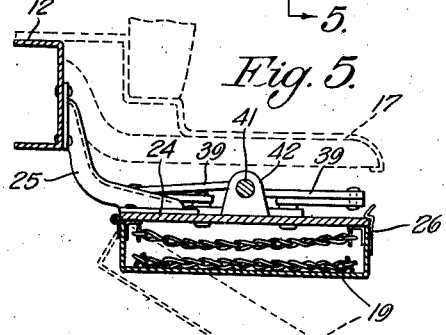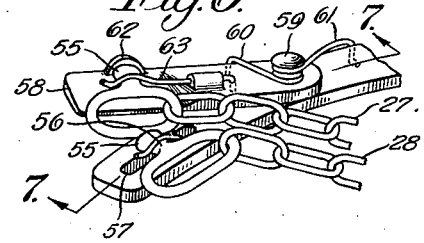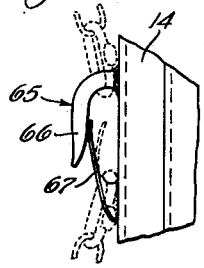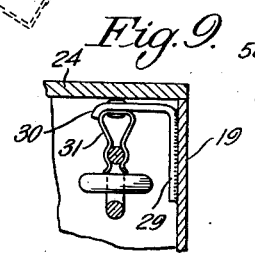

Patented June 20, 1944

2,351,601

UNITED STATES PATENT OFFICE 2,351,601

SKID CHAIN APPLIER

Robert Dabbs, Pittsburgh, Pa.

Application June 11, 1941, Serial No. 397,602

5 Claims. (Cl. 152—214)

My invention relates to new and useful improvements in mechanism for applying skid chains to the wheels of an automotive vehicle.

An important object of my invention is the provision of a mechanism of the above-mentioned character that may be incorporated in a conventional automobile construction and that is uniquely operative to permit the driver, while seated in the car, to manually actuate the mechanism which is thereby rendered automatically operative to apply the chains to the wheels of the vehicle.

Another object of my invention is the provision of a device of the above-mentioned character that may be operated while the vehicle is in motion.

Still another object of my invention is the provision of a device of the above-mentioned character that is characterized by simplicity of construction and by reliability and efficiency in operation.

Other objects and advantages of my invention will be apparent during the course of the following description.

In the drawings, forming a part of this specification, and wherein like numerals are employed to designate like parts throughout the same, Figure 1 is a top plan view of a mechanism embodying my invention and showing the same mounted on the chassis of an automotive vehicle with the wheel embracing arms thereof inoperatively disposed.

Figure 2 is a side elevation of the same.

Figure 3 is an enlarged top plan view of the mechanism for presenting the chain to the tire and illustrating the wheel embracing arms in an operative position, parts thereof being shown in section and parts being broken away for clearness of illustration.

Figure 4 is a longitudinal, vertical sectional view taken on the line 4—4 of Figure 3.

Figure 5 is a transverse, vertical sectional view taken on the line 5—5 of Figure 4.

Figure 6 is a fragmentary perspective view of the chain holding end of one of the wheel embracing arms, Figure 7 is a longitudinal, vertical sectional view taken on the line 7—7 of Figure 6.

Figure 8 is a fragmentary side elevation of the catch means mounted on the opposite sides of the vehicle wheel, and Figure 9 is a fragmentary, transverse sectional view taken on the line 9—9 of Figure 3.

In the accompanying drawings, wherein for the purpose of illustration is shown a preferred embodiment of my invention, the numeral 10 designates the chassis of a conventional automotive vehicle, which chassis includes frame members 11 and 12 supported by the rear axle housing 13 and the front axle housing (not shown). The drive wheels 14 mounted at the ends of the axle housing are driven in the conventional manner through mechanism contained in the differential housing 15 and axle housing 13. The fender 16 (see Figure 2) extends over the wheel 14 in the conventional manner and a running board 17 extends forwardly of the fender and laterally of the frame members, as best illustrated in Figures 2 and 5.

My invention is particularly concerned with a mechanism for applying skid chains to the wheels of the vehicle. As is well known, the rear wheels of the vehicle are generally the drive wheels thereof and it is therefore desirable that the mechanism be suitably arranged to apply the chains to the rear wheels. The drawings here illustrate mechanism as being thus arranged and the specificaiton will be directed to a description of these figures and their relation to the rear wheels of the vehicle.

Skid chains 18 of conventional construction are arranged within housings 19 mounted on the frame below the running boards, which chains are presented to the wheels 14 for application thereto by a mechanism 20. The mechanism is actuated by rotation of the rod 21 mounted transversely of the frame and the rod is rotated by means of a manually actuated pedal 22 extending through the floor boards of the vehicle forward of the driver's seat 23. I have here illustrated means for simultaneously applying skid chains to both rear wheels of the vehicle; however, inasmuch as these mechanisms are identical in their construction and operation, a detailed description of but one will be given.

The housing 19 is essentially box-like in its formation and includes a hinged cover 24 which is mounted on the frame immediately in advance of the wheel 14 by means of the brackets 25. The body of the housing is normally held in closed relation with the cover by means of the spring clips 26, which clips may be disengaged from the cover to permit the body to swing downwardly to the dotted line position illustrated in Figure 5 when it is desired to place the skid chains therein. When the chain is placed within the housing it is folded upon itself to provide an upper lead 27 and a lower lead 28 and the ends of both the upper and lower leads extend through the open end of the housing adjacent the wheel.

I have mounted a plurality of spaced brackets 29 on the side walls of the housing and each of the brackets include an arm portion 30 which extends into the housing directly below the cover for supporting the depending spring clips 31. The upper lead is stretched tautly within the housing and the links thereof which register with the spring clips are inserted therein whereby the upper lead 27 will be held in vertically spaced relation with the bottom of the housing and the end thereof will extend through the upper portion of the end opening. The lower lead of the chain rests upon and is supported by the bottom of the housing and the end thereof extends through the lower portion of the open end of the housing. It may thus be seen that the spring clips will maintain the upper and lower leads of the skid chain in vertically spaced relation and will prevent the same from becoming tangled or twisted therein during removal of the chain therefrom.

The mechanism 20 comprises a carriage plate 32 supported by the housing and having bell cranks 33 and 34 mounted for rocking movement at the opposite sides of the rearward end thereof by the pivot pins 35. The lower ends of the pivot pins extend through the cover of the housing and operate in spaced parallel slots 36. As best illustrated in Figure 3, the arms 37 and 38 of the bell cranks extend outwardly from the slots and the arms 37 thereof are pivotally connected to a pair of toggle levers 39 which are pivotally attached to the clevis 40 provided at the end of the slidably mounted rod 41.

The rod 41 is slidably supported in standards 42 upstanding from the cover of the housing and by an upturned flange 43 of the carriage plate. The clevis 40 is formed with an extension 44 which substantially bisects the toggle levers 39 and an abutment 45 carried thereby extends upwardly therefrom and between the said toggle levers. A tension coil spring 46 connects the toggle levers and normally resiliently acts to urge the same into pressed engagement with the opposite edges of the abutment. Thus, the abutment limits the inward swinging movement of the toggle levers and consequently the outward swinging movement of the arms 38 of the bell cranks. However, the toggle levers may move outwardly in a direction away from the abutment and against the resilient action of the coil spring 46. A compression coil spring 47 interposed between the forward standard 42 and the clevis 40 carried by the forward end of the rod normally holds the carriage plate in the retracted position illustrated in Figure 1, the forward movement of the rod being limited by seating of the lower ends of the pivot pins 35 in the forward ends of the slots 36. The rod may thus slide the bell cranks a distance limited by the length of the slots 36; however, the rods may be moved slightly after engagement of the pivot pins in the rearward ends of the slots. The collar 49 fixedly mounted on the rod intermediate the rear standard 42 and the upstanding flange 43 of the carriage limits the added movement of the rod which will occur only after the pivot pins have reached the rear ends of the slots for the reason that the spring 46 has sufficient strength to hold the toggle levers against the abutment 45 as long as the pivot pins 35 are free to slide in the slots. However, after the pivot pins seat in the rearward end of the slots, continued pressure against the rod 41 will slide the collar from the rear standard 42 to the flange 43 whereby to move the toggle levers 39 outwardly away from the abutment and to rock the arms 38 of the bell cranks inwardly.

Movement is imparted to the rod 41 by means of the manually actuated pedal 22. The pedal is pivoted to the frame and is formed with an arm 51 which extends downwardly and rearwardly from the pivot to connect with the arm 50 extending radially from the rod 21 through the medium of a connecting link 53. Another arm 52 fixedly connected to and extending radially from the rod 21 is connected at its free end to the clevis 48 of the rod 41 by means of the link arm 54. Application of pressure to the pedal will rock the arm 51 thereof upwardly and upward movement of the arm 51 will rock the rod 21 to slide the rod 41 in the direction of the wheel 14.

The ends of the lower lead of the skid chain projecting from the open end of the housing are releasably carried by the arms 38 of the bell cranks 33 and 34. The end links of the chains are formed with laterally extending knobs or heads 55 which are enlarged at the distal ends thereof to provide a relatively reduced intermediate neck portion 56. As best illustrated in Figure 6, the end links of the lower lead 28 are supported by the ends of the arms 38 and they are arranged with the major portion of the link projecting inwardly from the arm and with the reduced neck portion of the head overlying a slot 57. A spring arm 58 extends upwardly through the slot and overlies the neck portion, the resilient action thereof being operative to normally hold the link fixedly but releasably associated with the arm. The enlarged end portion 55 of the heads rest upon the arms at the outer side of the slots 57 and are normally engaged by the end links of the upper lead 27 which are supported by shanks 58 pivoted to the arms rearwardly of the slots 57 by the pins 59. The upper surface of each of the shanks is beveled so that the link carried thereby will incline angularly downwardly and against the headed portion of the link attached to the arm. Spring arms 60 and 61 extend from each of the pins 59 to overhang the outer edges of the arm and shank, respectively, at opposite sides of the pin. The resilient action of the spring arms reacts against the shank to urge the same in the direction of the arm whereby to press the link carried by the shank against the link carried by the arm. The distal end of the head of the link carried by the shank abuts against an upstanding lip 62 formed at the outer edge of the shank and a spring arm 63 extends across the reduced neck portion of the head 55 to hold the link normally securely but releasably associated with the shank.

When the links carried by the arms are disengaged therefrom, the spring arms 58 move downwardly into the slot 57 and the spring arms 60 and 61 act to swing the shanks 58 into superposed relation with the arms so that the headed links carried by the shanks will occupy the identical position previously occupied by the links carried by the arms. Swinging movement of the shanks in the above direction is limited by a depending lip 64 which engages the outer edge of the arms and prevents further swinging movement of the shanks.

As hereinabove described the arms 38 of the bell cranks 33 and 34 are normally held in a retracted position by the coil spring 47. The arms are normally spread a maximum distance apart and are arranged at opposite sides of the postjacent wheel 14. When the operator depresses the pedal 22 to slide the rod 41 rearwardly in the direction of the wheel, the pivot pins 35 will slide to the rearward end of the slots 36 to move the arms 38 of the bell cranks into embracing relation with the wheel. The end links of the spaced side chains of the lower lead 28 are attached to the arms of the bell cranks in the manner hereinabove described and the end links of the spaced side chains of the upper lead 27 are attached to the pivoted shanks 58 in the manner described. Continued depression of the pedal 22 after the pivot pins 35 have moved to the rearward ends of the slots will slide the collar 39 carried by the rod from the standard 42 to the flange 43 whereby to spread the toggle lever 39 and to rock the arms 38 of the bell cranks inward toward the opposite sides of the wheel.

Movement of the bell cranks in the above manner will shift the end links carried thereby into the path of rotation of the catch means 65 provided at the opposite sides of the wheel. Each of the catch means comprises a downwardly extending hook 66 and a spring arm 67. One end of the spring arm is attached to the wheel below the open end of the hook and the opposite end thereof extends upwardly and bears against the inner side of the hook, as illustrated in Figure 8.

Thus, when the links carried by the arms of the bell cranks are moved into the path of rotation of the hooks they will be engaged by the hooks as soon as the same move into register therewith. As the hooks enter the links, the spring arms 37 will be flexed to permit the links to move to the base of the hooks and above the end of the spring arm. Movement of the link in this manner will permit the spring arm to snap back against the hook whereby to efficaciously prevent inadverent removal of the link from the hook. Continued rotation of the wheel will pull the headed portions of the links out of engagement with the spring arms 58 and, upon the release of the spring arms, they will retract into the slots 57 whereby to permit the spring arms 60 and 61 to pivot the shanks 58 into superposed relation with the arms. Actuation of the shanks in this manner will cause the end links of the upper lead 27 to move into the path of rotation of the hooks 66.

Obviously, continued rotation of the wheel after the same engages the end links of the lower lead 28 will cause the skid chain to be wrapped therearound. During this operation the chain will be pulled from the housing the upper lead thereof being progressively released by the clips 31. After the wheel has made one complete revolution the hooks 66 will move into register with the links carried by the shanks 58 and will effect engagement therewith in the manner described in connection with the end links of the lower lead.

As soon as the above operation has been completed, the operator may release the pedal 22 and, upon such release, the combined action of the coil springs 46 and 47 will rock the arms 38 of the bell cranks outwardly away from the wheel of the vehicle and retract the same to the initial position. It is obvious that the chains may be simultaneously applied to both rear wheels of the vehicle and that the person seated in the car may perform this operation without leaving the car.

It is to be understood that the form of my invention, herewith shown and described, is to be taken as a preferred example of the same, and that various changes in the size, shape and arrangement of parts may be resorted to without departing from the spirit of my invention, or scope of the appended claims.

Having thus described my invention, I claim:

1. The combination with an automotive vehicle of a housing mounted forwardly of a wheel of the vehicle, hook elements provided at the opposite sides of the wheel, a skid chain having headed end links arranged within said housing and having its ends extending from the housing adjacent the wheel, arms pivotally and slidably mounted for movement relative to the hook elements carried by the said wheel, catch means carried by the arms for detachably holding the headed links at one end of the chain, complemental shanks pivotally mounted on the arms and movable toward the hooks, catch means carried by the shanks for detachably holding the headed links at the opposite end of the chain, spring means urging the shanks in a direction to effect engagement of the second-mentioned links with the headed portions of the said first-mentioned links, and means for simultaneously pivoting and sliding said arms in the direction of the wheel to dispose the links carried thereby in the path of rotation of the said hook elements.

2. The combination with an automotive vehicle of a housing mounted forwardly of a wheel of the vehicle, hook elements provided at the opposite sides of the wheel, a skid chain arranged within said housing and having its ends extending therefrom adjacent the wheel, arms pivotally and slidably mounted for movement relative to the hook elements carried by the said wheel, guide means for directing the movements of the arms, catch means carried by the arms for detachably holding the links at one end of the chain, complemental shanks pivotally mounted on the arms and movable towards the hooks, catch means carried by the shanks for detachably holding the links at the opposite end of the chain, spring means urging the shanks in a direction to effect engagement of the second-mentioned links with the said first-mentioned links, and means for simultaneously pivoting and sliding said arms in the direction of the wheel to dispose the links carried thereby in the path of rotation of the said hook elements.

3. The combination with an automotive vehicle of a housing mounted forwardly of a wheel of the vehicle, hook elements provided at the opposite sides of the wheel, a skid chain arranged within said housing and having its ends extending from the housing adjacent the wheel, clips within the housing for holding the chain stretched within the housing, arms pivotally and slidably mounted for movement relative to the hook elements carried by the said wheel, catch means carried by the arms for detachably holding the links at one end of the chain, complemental shanks pivotally mounted on the arms and movable towards the hooks on the wheel, catch means carried by the shanks for detachably holding the links at the opposite end of the chain, spring means urging the shanks in a direction to effect engagement of the second-mentioned links with the said first-mentioned links, and means for simultaneously pivoting and sliding said arms in the direction of the wheel to dispose the links carried thereby in the path of rotation of the said hook elements.

4. The combination with an automotive vehicle, of a housing mounted forward of a rear wheel, hook elements provided at the opposite sides of the wheel, a chain arranged within said housing and having its ends extending from the housing adjacent the wheel, clips within the housing for holding the chains stretched within the same, a carriage plate slidably mounted upon the upper side of the housing, pins carried by said plate and movable in slots carried by the housing, bell crank levers mounted on said pins, catch means carried by the free ends of the bell crank levers hooking into the end links of the chain, links pivotally connected to the inner ends of the bell crank levers, an operating rod pivotally connected to the inner ends of the links for moving the ends thereof towards the hooks on the wheel, and a spring member connecting the links.

5. The combination with an automotive vehicle, of a housing mounted forward of a rear wheel, hook elements provided at the opposite sides of the wheel, a chain arranged within said housing and having its ends extending from the housing adjacent the wheel, clips within the housing for holding the chains stretched within the same, a carriage plate slidably mounted upon the upper side of the housing, pins carried by said plate and movable in two spaced slots carried by the housing, bell crank levers mounted on said pins, catch means carried by the free ends of the bell crank levers hooking into the end links of the chain, auxiliary catch means pivotally carried by the free ends of the bell crank levers, an operating rod slidably mounted on the housing, links pivotally connected to the operating rod and the inner ends of the bell crank levers for moving the ends thereof towards the hooks on the wheel, and a coil spring connecting said links.

ROBERT DABBS.